Aug. 19, 1952     K. B. BRITTON     2,607,194
HYDRAULIC SYSTEM ACTUATOR
Filed June 23, 1948     3 Sheets-Sheet 1
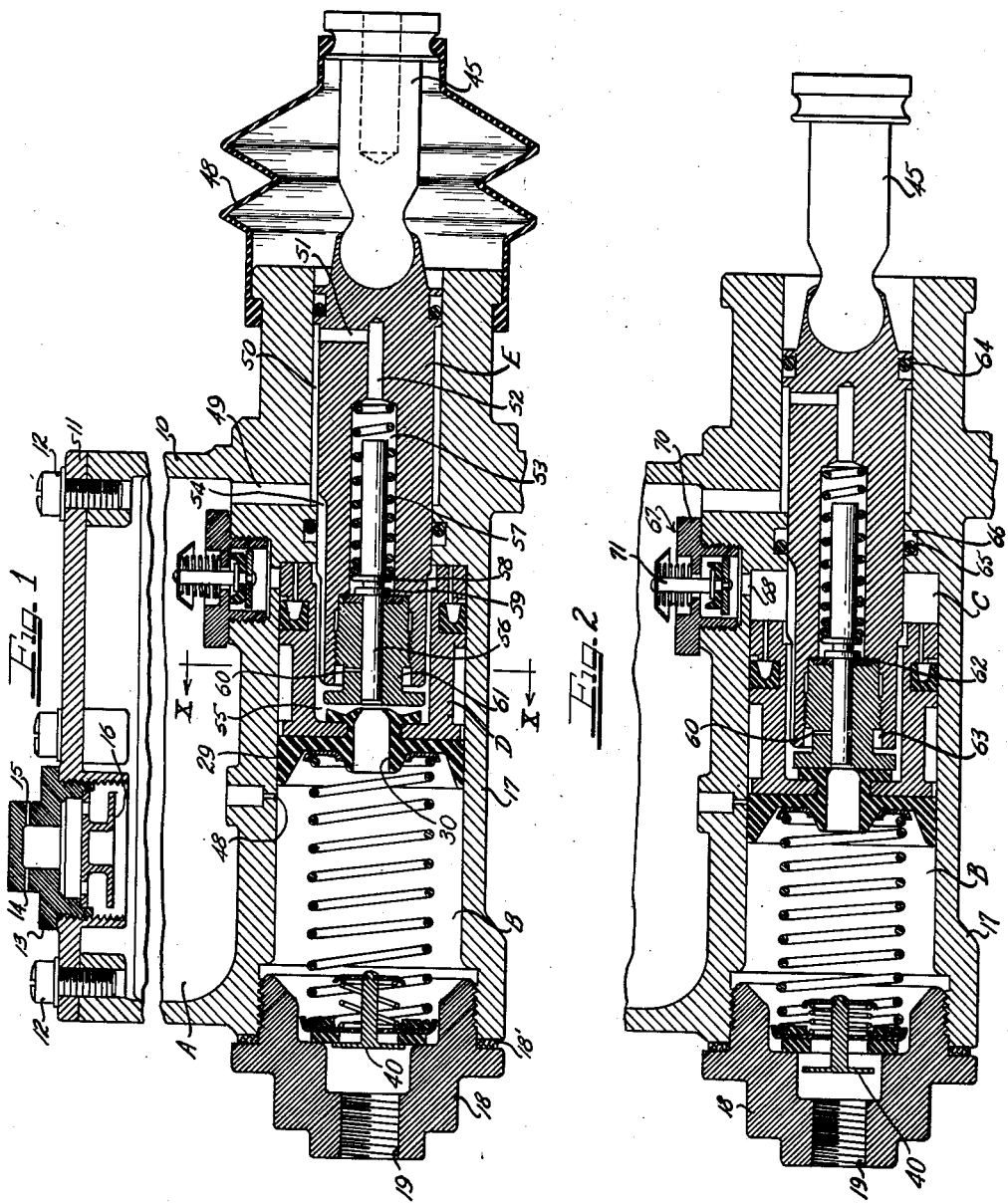
Inventor
KARL B. BRITTON
by The Firm of Charles w Hills Attys.

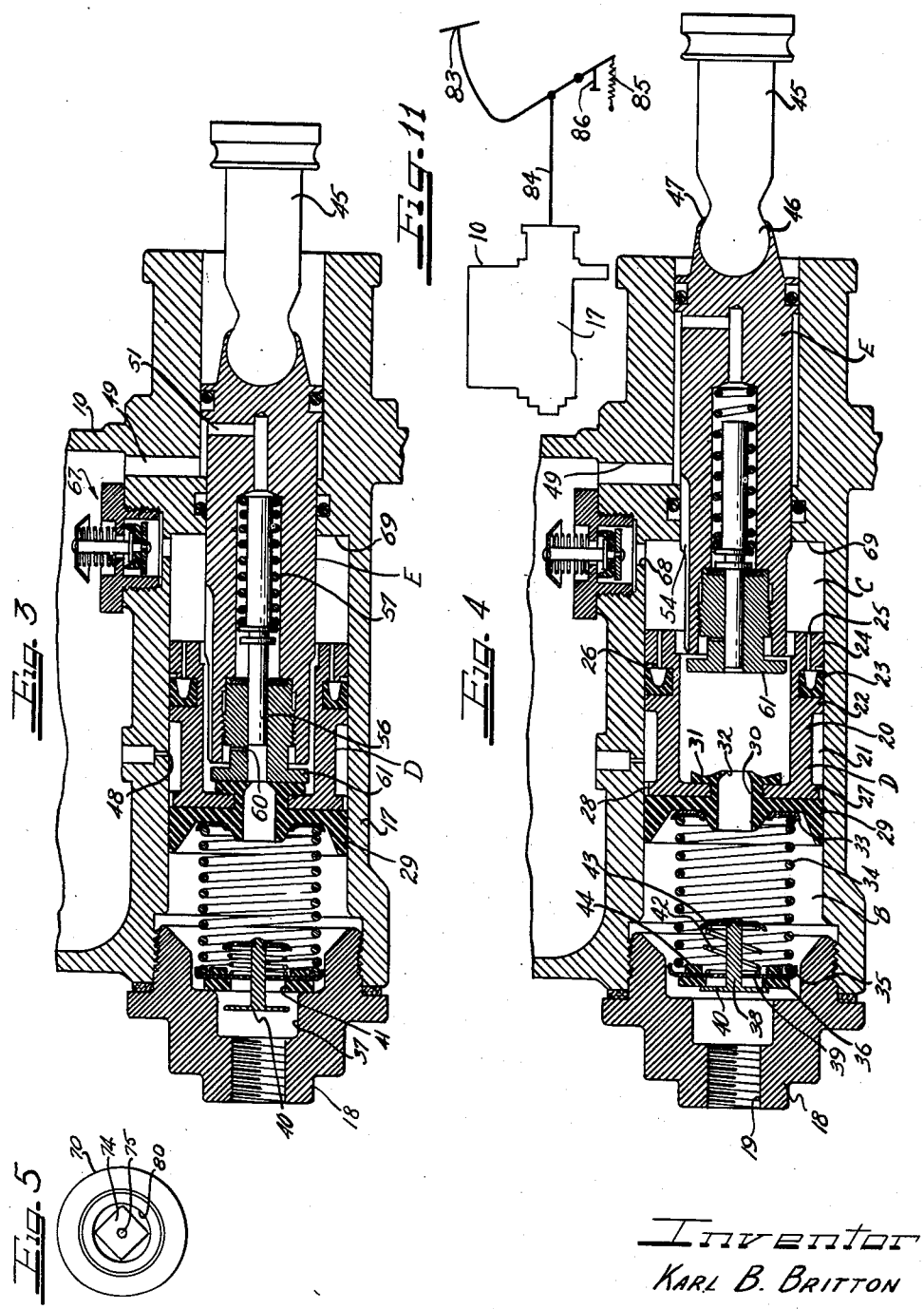

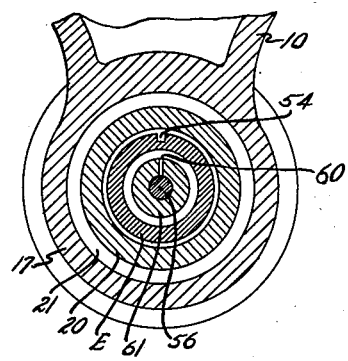
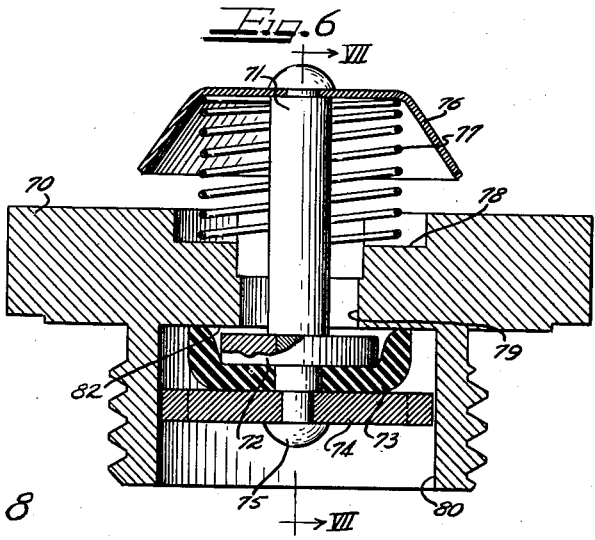
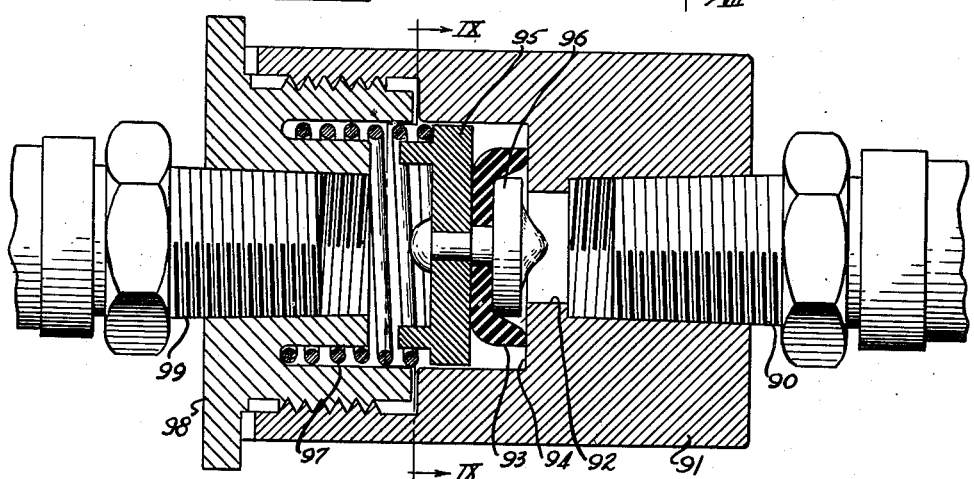
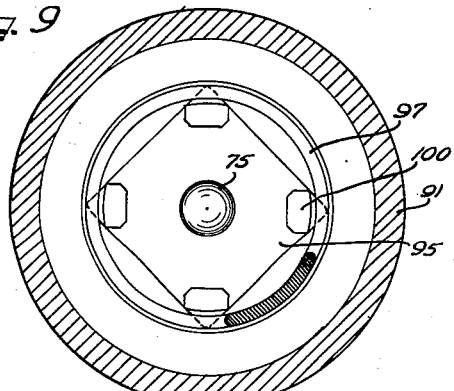
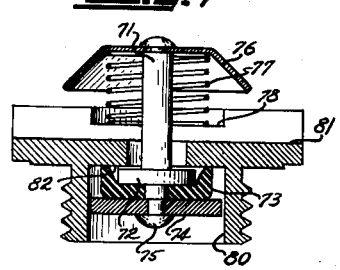

Patented Aug. 19, 1952

2,607,194

UNITED STATES PATENT OFFICE 2,607,194

HYDRAULIC SYSTEM ACTUATOR

Karl B. Britton, Bratenahl, Ohio

Application June 23, 1948, Serial No. 34,723

13 Claims. (Cl. 60—54.6)

This invention relates to improvements in hydraulic system actuators of the class known as master cylinders for operating hydraulic brakes on automobiles, airplanes and other vehicles. While the invention is particularly useful for operating hydraulic brakes, it embodies principles of construction and operation which make it suitable also for the operation of hydraulic jacks, hydraulic presses and other similar mechanisms. The general principles of construction and operation, from which various uses may be foreseen, will herein be described in considerable detail in connection with an hydraulic brake system for vehicles.

In an hydraulic brake system it is desirable that the initial movement of the brake pedal should accomplish, with the application of a moderate amount of brake pedal pressure and short pedal travel, a take-up movement of the system to bring the brake bands from fully released position into contact with the brake drums. Further movement of the brake pedal to apply braking pressure on the bands then requires an increased hydraulic pressure. Heretofore, various devices for obtaining quick initial action at low pressure followed by a slower action at higher pressure have been employed, but such devices of which I have knowledge have various defects which the present invention overcomes.

A general object of the present invention is to provide an improved master cylinder for the transmission of pressure into hydraulic systems which provides two stages of pressure in a construction of unusual simplicity.

Another object of the invention is to provide an improved master cylinder which automatically provides two stages of pressure during its operation and is so arranged that leakage from the system of the hydraulic fluid under pressure is eliminated.

Another object of the invention is to provide a device of the character described so constructed that the transition from low pressure to high pressure is accomplished quickly yet gradually enough so that the change in effective pressure is not noticeable at the pedal.

Another object of the invention is to provide for quick relief of the braking pressure.

Another object of the invention is to provide for quick application of maximum pressure when needed.

Other objects and advantages of the invention will become apparent upon perusal of the following specification.

The principles and mode of operation of the invention are herein disclosed in connection with a preferred embodiment of the invention, but it should be understood that the invention is not limited to the details of construction shown in the drawings.

In the drawings:

Figure 1 is a longitudinal sectional view showing a master cylinder made in accordance with the present invention and shown in its released position;

Figure 2 shows the position of the parts of the actuator approximately at the end of the take-up portion of its discharge stroke;

Figure 3 shows the position of the parts of the actuator during the final portion or high pressure portion of the discharge stroke;

Figure 4 shows the position of the parts of the actuator when pressure on the pedal has been completely released causing the piston rod to be withdrawn to fully released position, but while the piston is still returning to its fully released position;

Figure 5 is a bottom plan view of the check valve shown in Figure 6, but on the same scale at which it is shown in Figure 3;

Figure 6 is a vertical sectional view, on an enlarged scale of a check valve shown in Figures 1-4, inclusive;

Figure 7 is a vertical sectional view on the line VII—VII of Figure 6, but on a reduced scale;

Figure 8 is a longitudinal sectional view of a slightly modified form of the check valve of the type shown in Figure 6, illustrating its application to a position in a through pipe line;

Figure 9 is a sectional view on the line IX—IX of Figure 8;

Figure 10 is a vertical sectional view on the line X—X of Figure 1; and

Figure 11 is a diagrammatic illustration showing the actuator connected to a brake pedal.

Referring to the drawings, the body of the device includes a reservoir generally indicated as 10, located on top of the master cylinder for containing a supply of hydraulic fluid, so positioned that the fluid may flow into the cylinder actuator by gravity. A plate 11 for closing the top of the reservoir is provided and is secured in place by screws such as 12. The plate 11 is further provided with a threaded plug 13 for closing the filling opening, this plug having vents 14 and 15 for maintaining the fluid at atmospheric pressure in the reservoir. A perforated splash plate 16 is located in the hollow interior of the plug 13 to prevent splashing of the fluid through the vent openings. Preferably the reservoir is integral with the main cylinder which is generally designated at 17.

Threaded into the forward end of the cylinder 17 is a plug 18 seated against gasket 18' and having a threaded port 19 by means of which the actuator may be connected to the pipes of the hydraulic brake system.

The reservoir will be referred to hereinafter, at times, as chamber A, while the actuator cylinder provides a major bore containing a piston which divides this bore into a forward chamber B and a rear chamber C. The piston is herein generally designated as D, while the piston rod which propells the piston during the discharge or working stroke is designated herein as E.

The piston D includes a cylindrical body portion 20 somewhat smaller than the bore of the chamber B to provide an annular lubrication pocket 21 as shown. To the rear of this pocket an enlarged annular portion 22 of the piston slides on the cylinder bore, and immediately back of it is a rubber sealing ring 23. Beyond the annular pocket containing this washer is another enlarged portion 24 of the piston provided with a plurality of holes 25 which permit some flow of oil from the chamber C into the space occupied by the ring 23 and then through the small annular groove 26 to the outer surface of the ring 23 to lubricate the latter, especially during rearward travel.

The forward end of the piston D has another enlarged portion 27 provided with a plurality of grooves 28 for the purpose of supplying lubrication to the peripheral surfaces of the piston cup 29, this cup also being preferably made of rubber or other suitable resilient material. The cup 29 has a central passage 30, and an integral flange or washer 31 extending interiorly of the piston provided with a central apperture 32.

Seated on the forward face of the cup 29 is a metal spring retaining washer 33 for supporting one end of the spring 34, the other end of which seats against a metal spring retaining washer 35. The washer 35 carries on its forward face a rubber washer 36 which, under the conditions exemplified in Figures 1, 2 and 3, is seated to seal the margins of the passage 37 in the connector plug 18. The rubber washer 36 may be secured to the metal washer 35 in any appropriate manner to keep it properly centered thereon. For example, ears (not shown) may be struck out from the metal washer to grip and retain the rubber washer 36 or other suitable connecting means may be employed as may be desired. The metal cup washer 35 is perforated centrally to constitute a guide for the valve stem 38 and is also provided with a plurality of apertures 39 surrounding the central aperture for permitting the fluid to flow from the chamber B through the washer 35 into the passage 37.

The valve stem 38 is made integral with a valve 40 for sealing the central aperture 41 in the rubber washer 36. A spring 42 located between the metal washer 35 and a spring retaining washer 43 will normally seat the valve 40 on the washer 36 to seal the aperture 41. A rubber washer 44, fixed to the washer 35 in any suitable manner, is provided for the purpose of centering the spring 42.

Figures 2 and 3 show the valve 40 open as occurs when the brake pedal is depressed and oil or other liquid is being pumped from the actuator into the distributing pipes of the hydraulic brake system.

The composite valve structure whose seating member is the rubber washer 36, but which includes the valve 40, constitutes a residual line pressure check valve and is normally closed during the discharge action of the actuator but opens as shown in Figure 4 to permit oil to flow back from the hydraulic pipe system into the actuator after pressure on the brake pedal has been released. The valve 36 will remain open until only a small residual pressure remains in the pipe system, at which time the spring 34 will seat the washer 36 against the opening of the passage 37 to retain a small pressure in the pipe system. This function of the residual line pressure check valve is to maintain a small but positive pressure in the entire brake system when the brakes are fully released. This prevents air from seeping into the system and keeps the rubber cups in the individual brake cylinders distended.

The piston rod E is connected with a push rod 45 which in turn is mechanically linked to a brake pedal. The ball-shaped end 46 of the push rod is seated in a properly shaped recess therefor in the rear end of the piston rod, and as the flange portion 47 of the piston rod is peened inwardly to snugly grip the ball on the push rod, there is no necessity for any lost motion or free play between the push rod and the piston rod. Usually a flexible boot 48, shown only in Figure 1, will be applied as illustrated to exclude dirt and water from entering this part of the mechanism.

It will be apparent from viewing the drawings that the piston rod E is capable of propelling the piston D toward the left but is not adapted for retracting the piston.

When the actuator is at rest, the parts thereof will occupy the positions shown in Figure 1. At this time the reservoir A containing oil or other suitable liquid at atmospheric pressure will be in communication through the vertical passage 48 with the chamber B. At all times the reservoir communicates through the vertical passage 49, the horizontal annular space 50, and the passages 51 and 52, with the central passage 53 in the piston rod.

When the actuator is at rest, as in Figure 1, the reservoir is also in communication through passage 49 and relief groove 54 in the piston rod with the interior of the piston D at the space 55, and through the passage 30 in the rubber washer 29 with the chamber B. Thus, the entire cylinder to the rear of the seated valve 36 is subject only to the slight hydrostatic pressure of the liquid in the reservoir A.

The piston rod carries a transition valve 56 which is normally held in the forward position shown in Figure 1 by the spring 57 acting against the collar 58, the forward travel of the valve being limited by the collar or Z washer 59. In this position the transition valve covers a "metering" passage 60 leading radially outwardly through the plug 61 which is threaded into the forward end of the piston rod tightly against a metal washer 62. The annular recess 63 maintains the passage 60 always in communication with the hollow interior of the piston D.

A rubber ring 64 held under compression and disposed in the groove provided therefor near the rear end of the piston rod serves to prevent leakage of the oil backwardly into the boot 48. Another rubber ring 65 held under compression in the groove 66 provides a seal which functions when the piston rod is occupying the positions shown in Figures 2 and 3.

A check valve generally designated in Figure 2 as 67 is located as shown for the purpose of controlling the flow from the reservoir A through a passage 68. Certain novel features and advantages of this check valve will be discussed in more detail hereinafter, but for the purpose of explaining the mode of operation of this hydraulic system actuator the check valve 67 may be considered to operate as a check valve of ordinary design.

When the system is at rest, the brake shoe retractor springs connected with the individual wheel brakes are exerting a retracting force on their associate pistons and cylinder assemblies so that a small yet positive pressure is maintained in the conduit system but insufficient to unseat the valve assembly which seals the passage 37. The mechanical linkage connecting the push rod 45 with the brake pedal will, if properly adjusted, maintain the actuator parts as they are illustrated in Figure 1, that is, with a small amount of space between the face of the plug 61 in the piston rod and the face of the rubber washer 31 which is disposed interiorly of the piston D. This spacing allows a small amount of free pedal movement, which it is considered good practice to provide in hydraulic brake systems. The rear edge of the piston D at this time rests against annular shoulder 69.

The operator places his foot on the brake pedal and the initial movement of the brake pedal will take up this "free pedal" space and bring the head of the plug 61 against the rubber washer 31 and seal the passage 30. Further movement of the brake pedal will then cause the piston rod E to propel the piston D toward the left, on the discharge or working stroke. It requires only a moderate amount of brake pedal pressure and movement to advance the piston D approximately to the position shown in Figure 2, at which time the passage 48 is cut off from communication with the chamber B and pressure accumulating in chamber B will force open the valve 40 and raise the pressure in the conduit system sufficiently to bring the brake bands into contact with the respective brake drums.

Further movement toward the left of the piston D will raise the pressure in the chamber B and in the conduit system until this pressure reaches what may be here termed as the transition pressure. While this transition pressure is subject to variation in accordance with various designs, it may be assumed for the purpose of illustration that one desirable transition pressure is 120 pounds per square inch.

As soon as the piston rod reaches the position shown in Figure 2 it may be noted that communication from the reservoir to the chamber C through the passage 49 and groove 54 has been cut off. Consequently, as the piston rod advances further to the left some oil must be allowed to flow into the space at the rear of the advancing piston D. Accordingly, at this time the lowered pressure in chamber C causes the check valve 67 to open, as indicated in Figure 2, and oil will flow from the reservoir into the chamber C through passage 68.

When the transition pressure is reached, this higher pressure in the chamber B acting through the passage 30 in the piston cup 29 upon the end face of the transition valve 56 will then force that valve rearwardly against the action of its spring 57 until the metering port 60 becomes uncovered, as is illustrated in Figure 3. Immediately some of the pressure from chamber B will be transferred to the chamber C, causing the check valve 67 to close promptly. Further application of the brake pedal will of course advance the piston D further to the left, but as oil will flow from the chamber B through the metering port 60 into the chamber C, the amount of oil being displaced during this further travel is only that which is displaced by the piston rod itself. Thereafter, the actuator exerts, for any given pedal pressure, a higher hydraulic pressure on the hydraulic system, which is the desired object of this two-pressure stage hydraulic actuator.

While in point of time the transition from low pressure to high pressure takes place rather rapidly, yet the transition is nevertheless rendered more gradual by the resistance of the spring 57 to the opening of the metering port 60, hence the transition from low to high pressure is not objectionably noticeable at the brake pedal.

Gradual release of the pressure on the brakes is readily accomplished by gradually diminishing the pressure on the brake pedal. However, if quick release and total release of the brake bands is desired, the operator merely need lift his foot from the brake pedal, and the restoring spring 85 connected with the brake rod mechanism will draw the piston rod E quickly to its extreme right-hand position, illustrated in Figure 4 and in Figure 1. The uncovering of the passage 30 by the face of the plug 61 will immediately allow oil to flow from the chamber B into the hollow interior of the piston and into the chamber C around the end of the piston rod. This sudden reduction of pressure in the chamber B will enable the superior pressure in the conduit system to open the valve assembly including the seating ring 36, thus to relieve the pressure in the conduit system. The spring 34 will rapidly restore the piston to its normal position illustrated in Figure 1, and when the desired residual pressure is attained in the conduit system the valve seating ring 36 will again seat and close the passage 37 in the connecting plug 18.

It will also be noted that as the piston rod returns to its right-hand position the groove 54 again communicates with the passage 49, and hence flow from the chamber B to chamber C and back to the reservoir A will rapidly occur.

A typical "pumping up" operation of the brake system and the action of the parts in this master cylinder during such operation will now be described. Assuming that the brake pedal has been depressed to an intermediate position in which the brake bands are expanded, the pressure in the hydraulic lines is at the "boost" pressure, that is, above the transition pressure, and the piston D and the piston E are located about as shown in Figure 3. The operator then eases up on the brake pedal substantially and then restores it again to the assumed intermediate position.

When he releases pressure on the pedal, the relatively powerful pedal retractor spring 85 connected therewith will quickly move to the piston rod to the right, relieving its pressure from the piston D and uncovering passage 30 through the piston D. The piston return spring 34 will quickly move piston D to the right, aided by the fact that the pressure in chamber B will momentarily be higher than in chamber C.

Simultaneously, the pressure in chamber B will fall below the hydraulic line pressure enough to close valve 40 but, unless the pressure differential be too great, the residual line pressure valve comprising metal washer 35, rubber washer 36 and valve 40 will not open. Hence, as piston D moves to the right, fluid will flow from chamber C through passage 30 into chamber B, that is, to the left of piston D.

When the operator thereafter restores the pedal to the assumed intermediate position described above, it is apparent that the head of the piston rod will engage washer 31, sealing passage 30, before the pedal has reached the intermediate position, for the reason that piston D had during the momentary retraction of the brake pedal moved a short distance to the right. Hence, when the brake pedal again reaches the assumed intermediate position, the piston D will this time force an additional amount of hydraulic fluid into the lines, and, at the assumed intermediate position of the brake pedal, the system is now "pumped" up.

Nevertheless, when the brake pedal is released after pumping up or after merely normal application of the brakes, the pressure in chamber C will quickly be relieved to the reservoir A through passage 30, groove 54, and passage 49, and the piston D will return quickly in a normal manner to its fully released position.

Referring now to the check valve 67 and Figures 6 and 7, this valve as applied to the actuator comprises a plug 70 threaded tightly into a threaded aperture provided therefor in the actuator body as shown. A valve stem 71 is provided with the spaced shoulders shown to carry and position near its lower end a circular plate 72, a rubber cup washer 73, and a bottom clamping plate 74. The riveted end 75 of the lower end of the valve stem 71 holds these two plates and the rubber cup washer securely in place. The uper end of the valve stem is also riveted over to hold a spring retainer cup 76 which holds in place the restoring spring 77, the lower end of which is based on the shoulder 78. A passage 79 through the plug 70 is in communication with the passage 80 only when the cup washer 73 has been displaced downwardly. The spring 77 is, as shown, a relatively light spring which will seat the upper edge of the cup washer 73 lightly against the shoulder surrounding the central passage 79.

As shown in Figure 7, a transverse passage 81 cut through the top face of the plug 70 will permit oil to flow from the reservoir through the passage 79 even should the spring retaining cup 76 be resting on top of the plug 70. In fact, the passage 81 is cut deep enough so that the oil may flow into the passage 79 without passing through the coils of the spring.

When used in connection with the brake system actuator, the light spring 77 permits the check valve to open in response to a slight drop in pressure below the cup washer 73, but when the pressure builds up within the chamber C the cup washer will seat firmly and be expanded somewhat radially outwardly, the molded washer 73 being so shaped that it has no tendency to bend inwardly and thus be cut by the circular plate 72. Consequently, this form of check valve not only readily opens but also is leak-proof, not only under low pressure conditions but under high pressure conditions, that is, referring to back pressures tending to seat the check valve. In fact, any substantial back pressure will seat plate 72 against the margin 82 of passage 79, partially sealing the same, and making it impossible for rubber washer 73 to become entrapped over the top edge of plate 72.

As illustrated in Figure 5, the bottom retaining plate 74 is not circular as is the plate 72 but rather is generally square in shape so that past its flat sides oil may flow through the passage 80.

Figure 11 is included to show merely diagrammatically the mechanical means for propelling the piston rod forwardly, namely, the brake pedal 83 and the link 84 connected to the pedal and piston rod, while the spring 85 serves to restore the brake pedal and return the piston rod to the position shown in Figure 1. A set screw 86 is diagrammatically shown to indicate a means for adjusting the normal position of the piston rod so that, as shown in Figure 1, it will not seal passage 30. Other and perhaps more suitable adjusting means than the set screw 86 may be used in commercial practice.

Since the above described check valve, which is believed to have certain novel structural features, is useful not only in connection with the hydraulic system actuator herein described, but elsewhere, I have also shown how it may be used in a pipe system as illustrated in Figure 8. Here a conduit 90 is threaded into a valve housing 91 which is apertured at 92 for flow of a fluid. A rubber cup washer 93 normally seats against the shoulder 94 of the valve housing and is held properly connected to the spring loaded plate 95 by means of a retaining plate 96 riveted or otherwise suitably connected to the plate 95. The spring 97 disposed as shown to act on the plate 95 is based at its other end against the valve housing plug 98 which in turn is connected with a conduit 99. A plurality of bosses 100 are provided on the plate 95 to act as pilots for the spring 97 and to permit fluid to flow around them from right to left when the valve is open.

It is apparent that this form of check valve may readily be used to control fluid flow through a pipe line and, because of the advantageous shape of the cup washer 93, will prevent back flow and leakage readily under both low and high pressure conditions.

From the foregoing description and the drawings it will be apparent that the master cylinder or actuator herein disclosed will enable a hydraulic braking system to operate properly under any of the usual conditions of fast or slow pedal depression or pedal release. Under ordinary conditions of operation and maintenance "pumping up" the pressure in the system to higher than normal braking pressures will not be required. However, this "pumping up" feature is available and may be employed if needed.

While it is believed that the general arrangement of braking systems for automotive vehicles is well known to those skilled in this art, reference may be made to a disclosure of such a system in the U. S. Patent No. 2,114,991 of H. C. Bowen, issued April 26, 1938. With such a system my invention could readily be used.

While I have shown and described hereto in considerable detail a preferred embodiment of the invention, it should be understood that the invention is subject to some variation and modification from the details disclosed herein, without departing from the spirit and scope of the invention defined in the appended claims.

I claim as my invention:

1. In an hydraulic system actuator, a cylinder, a piston positioned in said cylinder dividing the same into first and second end chambers, means for connecting an hydraulic pipe system to the end of the cylinder associated with the first chamber, said piston having a central passage for the flow of fluid therethrough from one chamber to the other, a piston rod extending through one end of the cylinder into said second chamber and engageable with said piston surrounding said central passage for propelling the piston forwardly in said first chamber, spring means acting on said piston for urging it rearwardly in said first chamber, said piston rod having a central passage aligned with the central passage in said piston, laterally extending passage means in said piston rod for establishing communication between said central passage and said second chamber, a spring loaded valve in said piston rod central passage having one position for sealing off said lateral passage means, said valve being shiftable to another position against its spring by a predetermined high pressure in the first chamber to uncover said lateral passage means permitting fluid flow from the first chamber therethrough into said second chamber.

2. In an hydraulic system actuator, a cylinder, a piston positioned in said cylinder dividing the same into first and second end chambers, means for connecting an hydraulic pipe system to the end of the cylinder associated with the first chamber, said piston having a central passage for the flow of fluid therethrough from one chamber to the other, a piston rod extending through one end of the cylinder into said second chamber and engageable with said piston surrounding said central passage for propelling the piston forwardly in said first chamber, spring means acting on said piston for urging it rearwardly in said first chamber, said piston rod having a central passage aligned with the central passage in said piston, laterally extending passage means in said piston rod for establishing communication between said central piston rod passage and said second chamber, a spring loaded valve in said piston rod central passage having one position for sealing off said lateral passage means, said valve being shiftable to another position against its spring by a predetermined high pressure in the first chamber to uncover said lateral passage means permitting fluid flow from the first chamber therethrough into said second chamber, and means operative for retracting said piston rod relatively to said piston for unsealing said piston central passage and permitting fluid flow therethrough from the first chamber directly to the second chamber.

3. In an hydraulic system actuator body including a reservoir and a cylinder associated therewith, a piston reciprocable in said cylinder dividing said cylinder into first and second end chambers, means associated with the first chamber for the connection of an hydraulic pipe system, said piston having a central passage therethrough, means including a piston rod engageable with said piston adjoining said central passage operative during the take-up stroke of the piston rod to prevent fluid flow from the first chamber to the second chamber, said piston rod having a central longitudinal bore aligned with said piston central passage and a spring loaded valve in said bore operating with said piston rod during said take-up stroke of the piston rod to seal off said central passage, said piston rod extending through one end wall of said cylinder, intercommunicating passage means in said actuator body and in said piston rod maintaining constant communication between said reservoir and said piston rod central bore at the rear of said valve, longitudinally extending passage means in said piston rod normally communicating with the reservoir through said actuator body passage means only when the piston is fully retracted for permitting free flow of liquid from the reservoir into said second end chamber, said valve means being shiftable rearwardly against its spring by a predetermined pressure in the first chamber impressed thereon through said piston passage during the boost portion of the piston stroke, laterally extending passage means in said piston rod normally sealed by said valve during the take-up portion of said stroke but uncovered by said valve during the boost portion of the stroke establishing communication between the second chamber and the first chamber through said central bore of the piston rod and central passage of the piston for equalizing the pressure in the two chambers.

4. In an hydraulic system actuator, a reservoir, a cylinder associated therewith, a piston reciprocable in said cylinder dividing the cylinder into first and second end chambers, passage means communicating between the first chamber and reservoir uncovered by the piston when at rest but covered by the piston during its power stroke, a central passage through the piston, a piston rod extending through one end wall of the cylinder into said second chamber and operatively engageable with the piston for propelling the piston on its power stroke but inoperative for retracting said piston, passage means extending in said piston rod forwardly and rearwardly of said cylinder end wall and passage means in said reservoir establishing communication between said reservoir and said second chamber only when the piston rod is fully retracted, other passage means in said piston rod having an end thereof registrable with said piston central passage, and a spring loaded valve carried by said piston rod for controlling said other passage means, said valve being normally positioned by its spring to cut off flow through said other passage means and being shiftable by pressure in the first chamber imposed thereon through said piston central passage for permitting fluid flow from the first chamber to the second chamber through the piston rod.

5. In an hydraulic system actuator, a reservoir, a cylinder associated therewith, a piston reciprocable in said cylinder dividing the cylinder into first and second end chambers, passage means communicating between the first chamber and reservoir uncovered by the piston when at rest but covered by the piston during its power stroke, a central passage through the piston, a piston rod extending through one end wall of the cylinder into said second chamber and operatively engageable with the piston for propelling the piston on its power stroke but inoperative for retracting said piston, passage means extending in said piston rod forwardly and rearwardly of said cylinder end wall and passage means in said reservoir establishing communication between said reservoir and said second chamber only when the piston rod is fully retracted, other passage means in said piston rod having an end thereof registrable with said piston central passage, and a spring loaded valve carried by said piston rod for controlling said other passage means, said valve being normally positioned by its spring to cut off flow through said other passage means and being shiftable by pressure in the first chamber imposed thereon through said piston central passage for permitting fluid flow from the first chamber to the second chamber through the piston rod, said piston rod being retractible from operative engagement with said piston to establish free flow communication between the two chambers through the central passage in said piston.

6. In an hydraulic system actuator, a liquid reservoir, a cylinder, a piston reciprocable in said cylinder dividing the cylinder into first and second end chambers, a return spring for retracting the piston from the first chamber toward the second chamber, said piston having a central aperture for establishing communication between the first and second chambers, means including a piston rod extending through an end wall of the cylinder into said second chamber engaging said piston adjoining said central aperture normally sealing the aperture and operative for propelling the piston forwardly in the first chamber against the piston return spring but inoperative for retracting said piston, and means associated with said piston rod for retracting it out of engagement with said piston to unseal said aperture for establishing communication between the first and second chambers, the reservoir wall having a passage establishing communication from the reservoir to the surface of the piston rod outside of said chamber wall, the piston rod having a longitudinal surface groove positioned when the rod is fully retracted to register with said passage to establish communication from the reservoir and said second chamber.

7. In an hydraulic system actuator, a cylinder body having a large bore and a smaller coaxial bore, a piston reciprocable in said large bore dividing the large bore into first and second end chambers, return spring means for retracting the piston from the first chamber toward the second chamber, said piston having a central aperture for establishing communication between the first and second chambers, a piston rod slidable in the smaller bore and extending into said second chamber engageable with said piston adjoining said central aperture only when the piston rod is advanced from fully retracted position for propelling the piston into the first chamber against the piston return spring but inoperative for retracting said piston, said piston rod having a passage leading from the center of its forward face and extending rearwardly and laterally thereof, a transition valve in the piston rod spring loaded to block said piston rod passage normally but yieldable to a predetermined pressure impressed on said passage from the first chamber and its central aperture during a working stroke of the piston rod to open said passage for fluid flow from the first chamber to the second chamber, and means connected with said piston rod for retracting it out of engagement with said piston to unseal said aperature for establishing communication therethrough directly between the first and second chambers.

8. In an hydraulic system actuator, a body member having a cylinder and a reservoir integral therewith positioned above the cylinder, means for maintaining the reservoir at atmospheric pressure, a piston reciprocable in said cylinder dividing the cylinder into first and second end chambers and having a central aperture, a piston rod coaxial with the piston extending through one end wall of said cylinder into the second chamber engageable with the piston surrounding said aperture and operative for propelling the piston forwardly on its power stroke but inoperative for retracting the piston rearwardly, passage means in said piston rod extending from its forward end face centrally and longitudinally thereof to a position in the piston rod which is always outside of said cylinder end wall, passage means in said body member and radially disposed in the piston rod outside of said cylinder end wall establishing communication between the reservoir and the longitudinal passage in said piston rod, transverse passage means in the piston rod inside of said cylinder end wall establishing communication between said longitudinal passage and said second end chamber, a longitudinally reciprocable plunger valve positioned in said longitudinal passage and spring loaded normally to seal said transverse passage but yieldably responsive to a predetermined high pressure impressed thereon from the first chamber through said aperture to unblock said transverse passage, and peripheral sealing means between said piston rod and body member carried by the piston rod axially rearwardly of said radial passage means for preventing escape of fluid along the piston rod to the outside of said body member, said sealing means being at all times exposed only to the hydrostatic pressure of the liquid in the reservoir above said cylinder.

9. In an hydraulic system actuator, a master cylinder and a piston reciprocable therein dividing the cylinder into forward and rear chambers, a piston return spring for retracting the piston and stop means for limiting said retraction, a piston rod slidable through the end wall of the rear chamber and having a normal position out of contact with said piston but engageable with the piston during the takeup and boost strokes, a reservoir having a check valve controlled passage in open communication with said rear chamber only during said takeup stroke, passage means in the reservoir and in the piston rod in register only at the fully retracted position of the piston rod for connecting the rear chamber with the reservoir, passage means in the piston for directly connecting the two chambers, the piston rod having means including a spring loaded transition valve and a passage controlled by the valve effective for sealing off flow between said chambers through the piston during said take-up stroke only and operative during the boost stroke to permit flow through the piston and piston rod from the forward to the rear chamber.

10. In an hydraulic system of the class described, a supply reservoir, a single cylinder associated therewith, means for connecting a conduit distribution system to one end of the cylinder, a piston in said cylinder dividing the cylinder into first and second end chambers, the first chamber being associated with said conduit connection, a two-way check valve controlling communication between said first chamber and said conduit connection, said piston having a central passage therethrough, means including a piston rod extending into said second chamber and sealing said passage only during the take-up stroke, passage means in the reservoir wall connecting said first chamber with said reservoir when the piston is at rest and sealed off by said piston during the power stroke of the piston, said piston rod having a central bore extending therethrough one end of which communicates with the central passageway of the piston and the other end being in constant communication with said reservoir outside of said second chamber, a lateral passage in the piston rod for connecting said bore to said second chamber, a transition valve in said central bore and spring means normally seating said transition valve for sealing off communication between the first chamber and the second chamber through said lateral passage during the take-up stroke of the piston rod, said transition valve being yieldable against its spring upon the occurrence of a greater than predetermined pressure in said first chamber for regulatably admitting fluid flow from the first chamber to the second chamber through said lateral passage during the boost stroke of said piston rod.

11. In an hydraulic system of the class described, a fluid reservoir, a power cylinder associated therewith, a piston in said cylinder dividing said cylinder into a first end chamber and a second end chamber, said piston having a central passage therethrough, means including a piston rod directly connectible with a brake pedal to be moved positively thereby in either direction and adapted for propelling the piston only on its forward stroke and normally sealing off communication between the first and second chambers through said central passage during the take-up portion of the power stroke, said means further including a spring loaded valve in said piston rod yieldable upon the occurrence of a predetermined pressure in said first end chamber to unseal said central passage, and passage means in the piston rod also unsealed by said yielding of the valve located in said piston and proportioned to permit a restricted flow of fluid from said first end chamber to said second end chamber and check valve means between the reservoir and the second chamber blocking fluid flow therebetween when the ratio of the pressure in the second chamber to the pressure in the reservoir exceeds a predetermined value.

12. In an hydraulic system actuator, a fluid reservoir, a cylinder associated therewith, a piston reciprocable in the cylinder and dividing the cylinder into first and second end chambers, the piston having a central opening therethrough, a piston rod movably extending into the second chamber and engaging the piston adjacent the central opening therethrough to seal off the opening and move the piston toward the first chamber, the cylinder having a passage therein establishing communication between the second chamber and the reservoir, and means in the passage blocking fluid flow between the second chamber and the reservoir when the ratio of the pressure in the second chamber to the pressure in the reservoir exceeds a predetermined value.

13. In an hydraulic system actuator, a reservoir, a cylinder associated therewith, a piston reciprocable in the cylinder and dividing the cylinder into first and second end chambers, the piston having a central opening therethrough, resilient means urging the piston toward the second chamber, a piston rod movably extending into the second chamber and engaging the piston adjacent the central opening to seal off the opening and to move the piston toward the first chamber, and check valve means between the second chamber and the reservoir blocking fluid flow therebetween when the ratio of the pressure in the second chamber to the pressure in the reservoir exceeds a predetermined value.

KARL B. BRITTON.

REFERENCES CITED

The following references are of record in the file of this patent:

UNITED STATES PATENTS

| Number | Name | Date |
|---|---|---|
| 1,976,849 | Hewitt | Oct. 16, 1934 |
| 2,180,454 | Bowen | Nov. 21, 1939 |
| 2,206,629 | Bowen | July 2, 1940 |
| 2,273,693 | Burks | Feb. 17, 1942 |
| 2,340,113 | Dodge | Jan. 25, 1944 |
| 2,438,649 | Roy | Mar. 30, 1948 |
| 2,448,194 | Schnell | Aug. 31, 1948 |
| 2,508,403 | Knauss | May 23, 1950 |

FOREIGN PATENTS

| Number | Country | Date |
|---|---|---|
| 500,606 | Great Britain | Feb. 13, 1939 |